(12) United States Patent
Julsrud et al.

(10) Patent No.: US 7,288,135 B2
(45) Date of Patent: Oct. 30, 2007

(54) SOLID MULTICOMPONENT MIXED PROTON AND ELECTRON CONDUCTING MEMBRANE

(75) Inventors: Stein Julsrud, Skien (NO); Bent Erlend Vigeland, Skien (NO)

(73) Assignee: Norsk Hydro ASA, Oslo (NO)

( * ) Notice: Subject to any disclaimer, the term of this patent is extended or adjusted under 35 U.S.C. 154(b) by 353 days.

(21) Appl. No.: 10/494,383

(22) PCT Filed: Oct. 25, 2002

(86) PCT No.: PCT/NO02/00387

§ 371 (c)(1),
(2), (4) Date: Jun. 14, 2004

(87) PCT Pub. No.: WO03/037490

PCT Pub. Date: May 8, 2003

(65) Prior Publication Data

US 2004/0241071 A1 Dec. 2, 2004

(30) Foreign Application Priority Data

Oct. 31, 2001 (NO) .................................. 20015327

(51) Int. Cl.
*B01D 53/22* (2006.01)
(52) U.S. Cl. .................................................. 95/55; 96/4
(58) Field of Classification Search .................... 95/54; 423/219
See application file for complete search history.

(56) References Cited

U.S. PATENT DOCUMENTS 5,272,871 A    12/1993  Oshima et al.
5,637,259 A *  6/1997   Galuszka et al. ............. 252/373
5,821,185 A * 10/1998   White et al. ..................... 502/4
6,037,514 A    3/2000   White et al.
6,296,687 B2  10/2001   Wachsman et al.
6,786,952 B1 * 9/2004   Risdal et al. ................... 95/54

FOREIGN PATENT DOCUMENTS

EP    0962423    12/1999
WO    0123078    4/2001

OTHER PUBLICATIONS

Alexander S. Mukasyan et al., "Perovskite membranes by aqueous combustion synthesis: synthesis and properties", Separation and Purification Technology, 25, pp. 117-126, 2001.

* cited by examiner

*Primary Examiner*—Duane Smith
*Assistant Examiner*—Sonji Turner
(74) *Attorney, Agent, or Firm*—Wenderoth, Lind & Ponack, L.L.P.

(57) ABSTRACT

The present invention relates to a solid multicomponent mixed proton and electron conducting membrane for use in a reactor, where the membrane comprises a mixed metal oxide having a structure represented by the formula: $A_{1-x}A'_x(B_{1-y}B'_y)_wO_{3-d}$, wherein A is a lanthanide element or mixtures thereof, A' is an alkaline earth element or mixtures thereof, B is chromium, manganese, or iron, B' is titanium, aluminum, zirconium, or hafnium, and x, y, w, and d each represent a number such that $0 \leq x \leq 1$, $0 \leq y \leq 1$, $0.9 < w < 1.1$, and d equals a number that renders the compound charge neutral and is not less than zero and not greater than about 0.6.

6 Claims, 5 Drawing Sheets

SOLID MULTICOMPONENT MIXED PROTON AND ELECTRON CONDUCTING MEMBRANE

The present invention relates to a solid multicomponent mixed proton and electron conducting membrane for use in a reactor at temperatures above 600° C.

Dense inorganic membranes show promise for use in commercial processes for separating hydrogen from a hydrogen containing gaseous mixture. Of particular interest is separation of hydrogen from steam reformed natural gas. These membranes dissolve hydrogen gas as protons and electrons.

Membranes formed from mixed conducting oxides can be used to selectively separate hydrogen from a hydrogen containing gaseous mixture at elevated temperatures. Hydrogen transport occurs when a difference in the chemical potential of hydrogen ($\Delta \log p_{H2}$) exists across the membrane. On the high hydrogen partial pressure side of the membrane, molecular hydrogen dissociates into protons and electrons which migrate to the low hydrogen partial pressure side of the membrane and recombine there to form hydrogen molecules. The rate at which hydrogen permeates through the membrane is mainly controlled by three processes; (I) the rate of hydrogen exchange at the high hydrogen partial pressure surface of the membrane, (II) the hydrogen diffusion rate within the membrane and (III) the rate of hydrogen exchange on the low hydrogen partial pressure surface of the membrane. If the rate of hydrogen permeation is controlled by the hydrogen diffusion rate, the hydrogen permeability is known to be inversely proportional to the membrane thickness (Fick's law). If the membrane thickness is decreased below a certain critical membrane thickness which depends on temperature and other process parameters, surface hydrogen exchange on one or both membrane surfaces will become rate limiting for the hydrogen permeation. The rate of hydrogen permeation is then less dependent on the membrane thickness.

The hydrogen diffusion rate in the bulk of the membrane is dependent on the solubility of hydrogen in the membrane material, as well as the mobility. The mobility of hydrogen is determined not only by the mobility of protons, but also by the mobility of electrons.

For a technological utilisation of these hydrogen membranes, the membrane material must fulfil certain requirements in addition to being a good conductor of hydrogen. These fall into three categories; thermodynamic stability under static conditions, thermodynamic stability under dynamic conditions, and mechanical stability.

The membrane material must be thermodynamically stable under any static condition within the appropriate temperature and oxygen partial pressure range. Furthermore, the membrane material must be stable against reaction with the additional components in the gaseous phase (e.g. $CO_2$, $H_2O$, $NO_x$, $SO_x$), and any solid phase in contact with it (e.g., seals and support material). This calls for different materials for different applications.

A membrane material that fulfils all the stability requirements under static conditions, may still be unstable when it is placed in a potential gradient. Any multicomponent material kept in a potential gradient, e.g. oxygen partial pressure gradient or electrical potential gradient, will be subjected to driving forces acting to demix or decompose the material. These phenomena are called kinetic demixing and kinetic decomposition and are well described in the literature (e.g., Schmalzried, H. and Laqua, W., Oxidation of Metals 15 (1981) 339).

Kinetic demixing acts to gradually change the cation composition of the membrane along the axis parallel to the applied potential. This phenomenon will always occur in materials where a mixture of cations is present on the same sublattice. Kinetic demixing may or may not reduce the performance and lifetime of the membrane. Kinetic decomposition implies a total breakdown of the compound or compounds comprising the membrane, and results in the appearance of decomposition compounds on the membrane surface. This phenomenon occurs in all multicomponent materials when placed in a potential gradient exceeding a certain critical magnitude. A membrane kept in an oxygen partial pressure gradient large enough for kinetic decomposition to take place, will have its performance and lifetime reduced.

The production of hydrogen from natural gas by steam reforming is a well known art. The steam reforming reaction may be written

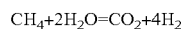
$$CH_4 + 2H_2O = CO_2 + 4H_2$$

This reaction is favoured by high temperature, thermodynamically as well as kinetically. It is therefore considered to be of great advantage to perform the steam reforming at high temperature. By increasing the temperature, e.g. from 500 to 800° C., the amount of hydrogen produced by the steam reforming reaction is increased by a factor of four at a total pressure of 20 bar. By extracting hydrogen by means of a hydrogen membrane, the steam reforming reaction is shifted to the right and more hydrogen is produced. The dense ceramic hydrogen membranes, disclosed in the present invention, allow for the use of temperatures as high as 900° C. or above, which ensures efficient production of pure hydrogen.

The process conditions of the relevant process define the environs of the membrane and play a determining role in the selection of membrane material. Examples of typical process parameters for the production of hydrogen from steam reformed natural gas are given in Tables 1 and 2. The oxygen partial pressure is determined by the equilibrium:

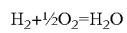
$$H_2 + \tfrac{1}{2}O_2 = H_2O$$

Both processes are characterized by reducing conditions, with high partial pressures of $H_2O$ and $CO_2$. The oxygen and $CO_2$ partial pressures, in particular, are critical parameters which restrict the choice of materials for these hydrogen membranes.

TABLE 1

Example of process parameters for a hydrogen production process

|  | Syngas side | $H_2$ side |
|---|---|---|
| Temperature | 700° C. | 700° C. |
| Total pressure | 20 bar | 1.5 bar |
| $P_{H2}$ | 3-7 bar | 0.2-1 bar |
| $P_{O2}$ | $10^{-21}$ bar | $10^{-21}$-$10^{-19}$ bar |
| $P_{CO2}$ | 2-7 bar | 0 bar |
| $P_{H2O}$ | 3-6 bar | 0.5-1.3 bar |

TABLE 2

Example of process parameters for a hydrogen production process

|  | Syngas side | $H_2$ side |
|---|---|---|
| Temperature | 900° C. | 900° C. |
| Total pressure | 20 bar | 1.5 bar |
| $P_{H2}$ | 5-12 bar | 0.2-1 bar |
| $P_{O2}$ | $10^{-17}$ bar | $10^{-17}$-$10^{-15}$ bar |
| $P_{CO2}$ | 1-4 bar | 0 bar |
| $P_{H2O}$ | 4-5 bar | 0.5-1.3 bar |

Dense hydrogen membranes have been described previously.

Pd based metal membranes are described by e.g. U.S. Pat. No. 1,174,631, U.S. Pat. No. 2,773,561, and U.S. Pat. No. 4,388,479. The main disadvantages associated with these membranes are the cost of Pd, and moreover the insufficient microstructural stability, and therefore lifetime, at temperatures exceeding 400-500° C.

U.S. Pat. No. 5,821,185 discloses a catalytic membrane which is a proton and electron mediating membrane and said membrane comprising a single-phase mixed metal oxide material of formula:

$$AB_{1-x}B'_xO_{3-y}$$

wherein A is selected from Ca, Sr or Ba ions; B is selected from Ce, Tb, Pr, or Th ions; B' is selected from Ti, V, Cr, Mn, Fe, Co, Ni, Cu, Al, Ga, or In ions, or combinations thereof; y depends upon the valences A, B and B' and is a number that provides for charge balancing and x is greater than or equal to 0.02 and less than or equal to 0.5.

The main disadvantage of these membrane compositions is their poor stability against reaction with carbon dioxide.

The main object of the present invention was to arrive at a membrane capable of transporting hydrogen, and showing good stability against reaction with carbon dioxide and against reduction of oxide components to metal at temperatures above 600° C.

Another object of the present invention was to arrive at a durable membrane, characterized by good microstructural and mechanical stability at temperatures above 600° C.

The inventors found that a certain class of multicomponent metallic oxides are particularly suited as hydrogen membrane materials in processes with temperatures above 600° C. where the feed gas stream contains partially oxidized hydrocarbons at elevated pressure, and the feed gas stream consequently is characterized by a low partial pressure of oxygen and high partial pressures of carbon dioxide and water. Materials of these compositions are known to have good mechanical strength and good microstructural stability at temperatures of 600 to 1100° C. Additionally, due to their high stability against carbon dioxide and water, and high stability at low partial pressures of oxygen, these materials are particularly suited as membranes for the production of hydrogen from partially oxidized hydrocarbons.

The compositions according to the present invention are based on the so-called perovskite structure, named after the mineral perovskite, $CaTiO_3$. It is well known that calcium and titanium can be replaced by or substituted by a large number of metal elements while retaining the perovskite structure, but the majority of such compositions either do not conduct protons or electrons, or do not have the required thermodynamic or mechanical stability. The inventors found that compositions represented by the general formula $A_{1-x}A'_x(B_{1-y}B'_y)_wO_{3-d}$, wherein A is a lanthanide element or mixtures thereof, A' is an alkaline earth element or mixtures thereof, B is chromium, manganese, or iron, B' is titanium, aluminium, zirconium, or hafnium, and x, y, w, and d each represent a number such that $0 \leq x \leq 1$, $0 \leq y \leq 1$, $0.9 < w < 1.1$, and d equals a number that renders the compound charge neutral and is between zero and about 0.6, fulfil all these requirements.

Normally compositions crystallizing in the perovskite structure of the above general formula are made stoichiometric, i.e. w=1. The inventors found, however, that by varying w in the range of from about 0.9 to about 1.1, important mechanical properties such as high temperature creep behaviour and microstructural stability can be controlled and improved. FIG. 5 shows an example of the effect on high temperature creep. Also the tendency of materials to undergo kinetic demixing or decomposition can be reduced by optimizing the value of w in the range of from about 0.9 to about 1.1.

Representative compositions of the present invention include, but are not restricted to: $La_{0.9}Sr_{0.1}CrO_{3-d}$, $La_{0.9}Sr_{0.1}Cr_{1.02}O_{3-d}$, $La_{0.9}Sr_{0.1}Cr_{0.98}O_{3-d}$, $La_{0.85}Ca_{0.15}CrO_{3-d}$, $La_{0.9}Sr_{0.1}MnO_{3-d}$, $SrFe_{0.07}Ti_{0.95}O_{3-d}$, $SrCr_{0.05}Ti_{0.93}O_{3-d}$, $La_{0.9}Sr_{0.1}Cr_{0.23}Al_{0.8}O_{3-d}$, $La_{0.7}Sr_{0.3}Cr_{0.8}Zr_{0.2}O_{3-d}$, and $La_{0.8}Sr_{0.2}Cr_{0.9}Hf_{0.1}O_{3-d}$. Preferred compositions of the present invention have A' representing calcium or strontium. A' representing magnesium is less preferred, because of the small ionic size of magnesium. A' representing barium is less preferred, because the presence of barium lowers the stability toward carbon dioxide and steam.

The most preferred element represented by A, is lanthanum. The lanthanum ion is larger than the other rare earth trivalent ions, and compositions with A representing lanthanum are more stable and have a larger solubility of hydrogen.

Particularly suitable compositions according to the present invention have B representing chromium. Compositions containing chromium tend to dissolve more hydrogen and are more stable with respect to reduction of the multicomponent oxide to metal.

In processes where kinetic demixing potentially may reduce the performance of the membrane, the most preferred compositions are the simpler compositions with y=0. In such cases compositions having formulas $La_{1-x}Ca_xCr_wO_{3-d}$ and $La_{1-x}Sr_xCr_wO_{3-d}$, wherein $0 \leq x \leq 0.5$ and $0.9 < w < 1.1$, are particularly suitable.

The invention will be further explained and envisaged in the following examples and figures.

| Time (h)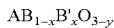 | $P_{H2}$ (bar) | $P_{H2O}$ (bar) |
|---|---|---|
| 10-23 | 0.20 | 0.02 |
| 23-27 | 0.12 | 0.40 |
| 27-28 | 0.30 | 0.40 |
| 28-30 | 0.60 | 0.40 |
| 30-31 | 0.00 | 0.40 |

-continued

| Time (h)[*] | $P_{H2}$ (bar) | $P_{H2O}$ (bar) |
|---|---|---|
| 31-35 | 0.12 | 0.40 |
| 35-70 | 0.20 | 0.02 |

[*]after start of experiment

Figure 4:
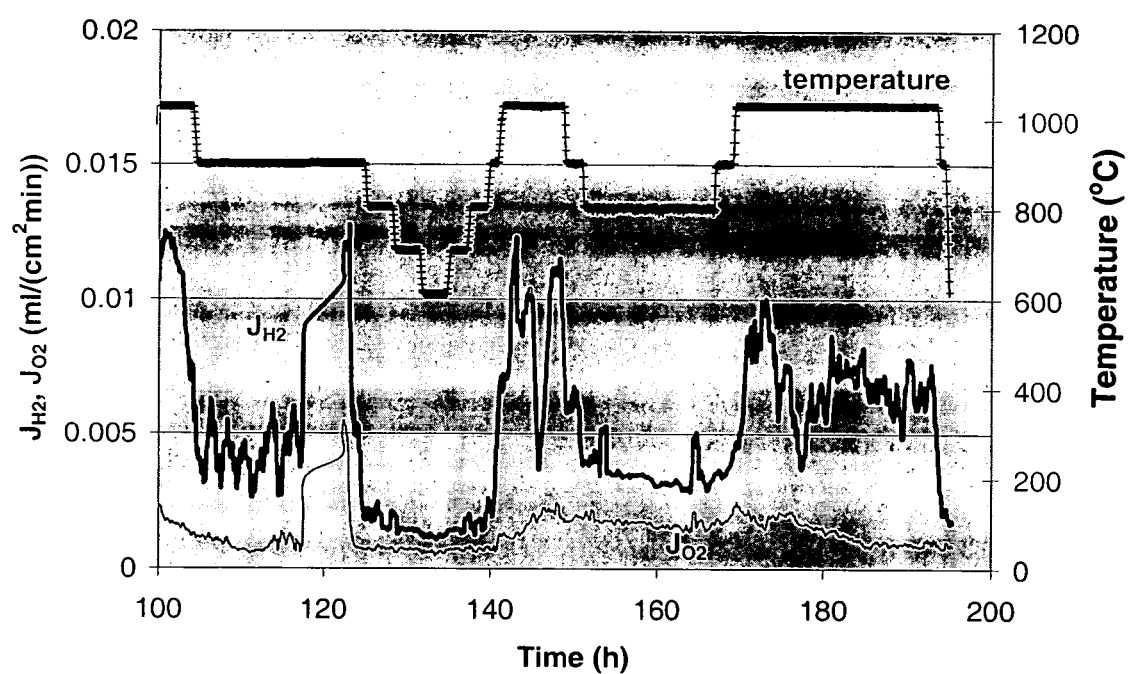

FIG. 4 shows the hydrogen permeation characteristics of the membrane material of Example 3. The hydrogen and water partial pressures in the gas at the high $P_{H2}$ side of the membrane were as follows:

| Time (h)[*] | $P_{H2}$ (bar) | $P_{H2O}$ (bar) |
|---|---|---|
| 100-103 | 0.30 | 0.40 |
| 103-142 | 0.10 | 0.02 |
| 142-145 | 0.06 | 0.40 |
| 145-153 | 0.30 | 0.40 |
| 153-165 | 0.10 | 0.02 |
| 165-167 | 0.06 | 0.40 |
| 167-173 | 0.30 | 0.40 |
| 173- | 0.10 | 0.02 |

[*]after start of experiment

Figure 5:
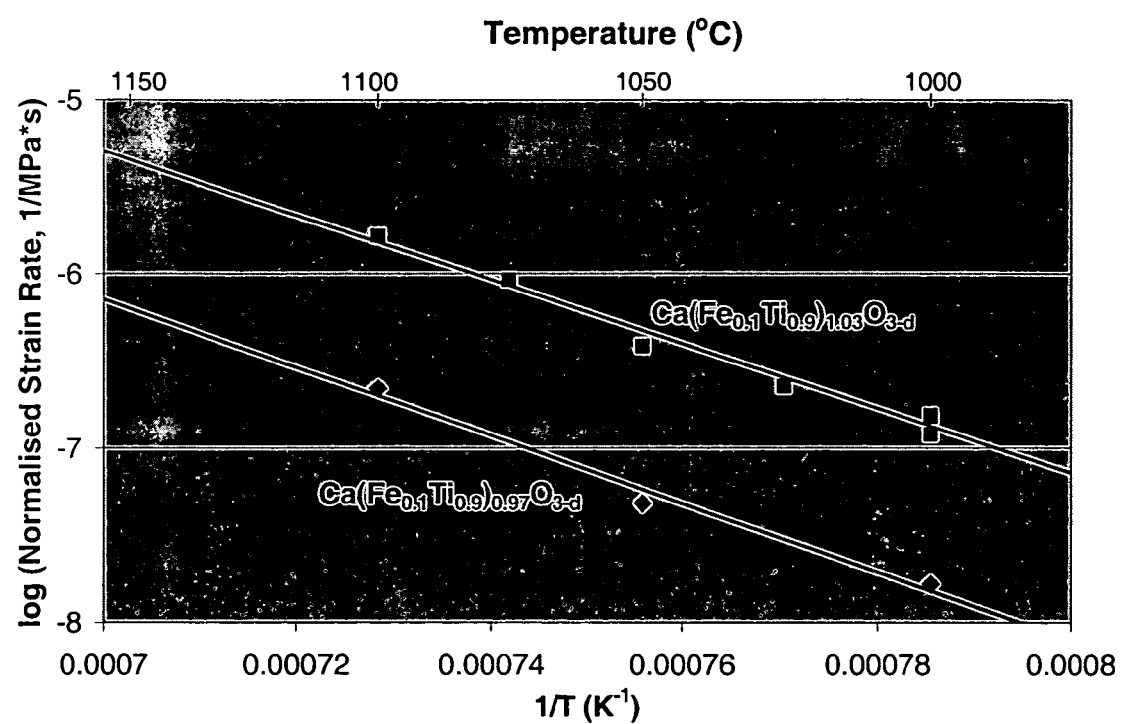

FIG. 5 shows the high temperature creep behaviour of the membrane materials of Examples 6 and 7.

EXAMPLE 1

Preparation of $La_{0.9}Ca_{0.1}CrO_{3-d}$

A solid mixed conducting membrane was prepared by a soft chemistry route wherein the appropriate amounts of $La_2O_3$ and $CaCO_3$ were first dissolved in nitric acid. To this liquid mixture was added the appropriate amount of a preprepared standardised 1M aqueous solution of $Cr(NO_3)_3$. The mixture was added citric acid in excess, and excess water was evaporated for 3 hours at 90° C., during which time complexation takes place. The resulting gel was dried in air for 14 hours by heating to 140° C., whereupon the organic matter was removed by subjecting the sample to 500° C. for 2 hours. The powder was calcined at 800° C. for 10 hours and thereby ground in a planetary mill with grinding media of yttria stabilised zirconia. The powder mixture was then combined with a binder and uniaxially cold pressed to a Ø13 mm disk at 180 MPa. The resulting porous disk was heated to 500° C. at 3°/min in air to allow controlled combustion of the binder, and then further heated to 1700° C. in 4% $H_2$ in $N_2$, maintained at 1700° C. for 5 hours and cooled to room temperature. This procedure yielded a Ø10 mm gas tight disk with >95% of theoretical density. The membrane was polished on both sides to a 1 micron surface finish and 1.00 mm thickness. The formula representing the product may be expressed as $La_{0.9}Ca_{0.1}CrO_{3-d}$.

EXAMPLE 2

Preparation of $La_{0.9}Sr_{0.1}CrO_{3-d}$

A solid mixed conducting membrane was prepared according to the method of Example 1 except using $SrCO_3$ instead of $CaCO_3$ to yield a product that may be represented by the formula $La_{0.9}Sr_{0.1}CrO_{3-d}$. The procedure yielded a Ø10 mm gas tight disk with >97% of theoretical density. The membrane was polished on both sides to a 1 micron surface finish and 1.00 mm thickness.

EXAMPLE 3

Preparation of $La_{0.75}Sr_{0.25}CrO_{3-d}$

A solid mixed conducting membrane was prepared according to the method of Example 2 to yield a product that may be represented by the formula $La_{0.75}Sr_{0.25}CrO_{3-d}$. The procedure yielded a Ø10 mm gas tight disk with >97% of theoretical density. The membrane was polished on both sides to a 1 micron surface finish and 1.00 mm thickness.

EXAMPLE 4

Preparation of $La_{0.95}Sr_{0.05}MnO_{3-d}$

A solid mixed conducting membrane was prepared by a soft chemistry route wherein the appropriate amounts of $La_2O_3$ and $SrCO_3$ were first dissolved in nitric acid. To this liquid mixture was added the appropriate amount of a preprepared standardised 1M aqueous solution of manganese nitrate. The mixture was added citric acid in excess, and excess water was evaporated for 3 hours at 90° C., during which time complexation takes place. The resulting gel was dried in air for 14 hours by heating to 140° C., whereupon the organic matter was removed by subjecting the sample to 500° C. for 2 hours. The powder was calcined at 900° C. for 10 hours and thereby ground in a planetary mill with grinding media of yttria stabilised zirconia. The powder mixture was then combined with a binder and uniaxially cold pressed to a Ø13 mm disk at 180 MPa. The resulting porous disk was heated to 500° C. at 3°/min in air to allow controlled combustion of the binder, and then further heated to 1225° C. in air, maintained at 1225° C. for 3 hours and cooled to room temperature. This procedure yielded a Ø10 mm gas tight disk with >95% of theoretical density. The membrane was polished on both sides to a 1 micron surface finish and 0.95 mm thickness. The formula representing the product may be expressed as $La_{0.95}Sr_{0.05}MnO_{3-d}$.

EXAMPLE 5

Preparation of $SrTi_{0.95}Fe_{0.07}O_{3-d}$

A solid mixed conducting membrane was prepared by a soft chemistry route wherein the appropriate amounts of $SrCO_3$ and titanyl acetylacetonate were first dissolved in nitric acid. To this liquid mixture was added the appropriate amount of a preprepared standardised 1M aqueous solution of iron nitrate. The mixture was added citric acid in excess, and excess water was evaporated for 3 hours at 90° C., during which time complexation takes place. The resulting gel was dried in air for 14 hours by heating to 140° C., whereupon the organic matter was removed by subjecting the sample to 500° C. for 2 hours. The powder was calcined at 900° C. for 10 hours and thereby ground in a planetary mill with grinding media of yttria stabilised zirconia. The powder mixture was then combined with a binder and uniaxially cold pressed to a Ø13 mm disk at 180 MPa. The resulting porous disk was heated to 500° C. at 3°/min in air to allow controlled combustion of the binder, and then further heated to 1300° C. in air, maintained at 1300° C. for 3 hours and cooled to room temperature. This procedure yielded a Ø10 mm gas tight disk with >95% of theoretical density. The membrane was polished on both sides to a 1 micron surface finish and 0.80 mm thickness. The formula representing the product may be expressed as $Sr(Ti_{0.95}Fe_{0.07})O_{3-d}$.

EXAMPLE 6

Preparation of $Ca(Fe_{0.1}Ti_{0.9})_{0.97}O_{3-d}$

A solid mixed conducting membrane was prepared by a soft chemistry route wherein the appropriate amounts of $CaCO_3$ and titanyl acetylacetonate were first dissolved in nitric acid. To this liquid mixture was added the appropriate amount of a preprepared standardised 1M aqueous solution of iron nitrate. The mixture was added citric acid in excess, and excess water was evaporated for 3 hours at 90° C., during which time complexation takes place. The resulting gel was dried in air for 14 hours by heating to 140° C., whereupon the organic matter was removed by subjecting the sample to 500° C. for 2 hours. The powder was calcined at 900° C. for 10 hours and thereby ground in a planetary mill with grinding media of yttria stabilised zirconia. The powder mixture was then combined with a binder and uniaxially cold pressed to a Ø13 mm disk at 180 MPa. The resulting porous disk was heated to 500° C. at 3°/min in air to allow controlled combustion of the binder, and then further heated to 1150° C. in air, maintained at 1150° C. for 3 hours and cooled to room temperature. This procedure yielded a Ø10 mm gas tight disk with >95% of theoretical density. The membrane was polished on both sides to a 1 micron surface finish and 1.00 mm thickness. The formula representing the product may be expressed as $Ca(Fe_{0.1}Ti_{0.9})_{0.97} O_{3-d}$.

EXAMPLE 7

Preparation of $Ca(Fe_{0.1}Ti_{0.9})_{1.03}O_{3-d}$

A solid mixed conducting membrane was prepared according to the method of Example 6 to yield a product that may be represented by the formula $Ca(Fe_{0.1}Ti_{0.9})_{1.03}O_{3-d}$. The procedure yielded a Ø10 mm gas tight disk with >95% of theoretical density. The membrane was polished on both sides to a 1 micron surface finish and 1.00 mm thickness.

EXAMPLE 8

Structure of $La_{0.9}Ca_{0.1}CrO_{3-d}$ and $La_{0.9}Sr_{0.1}CrO_{3-d}$

Figure 1:
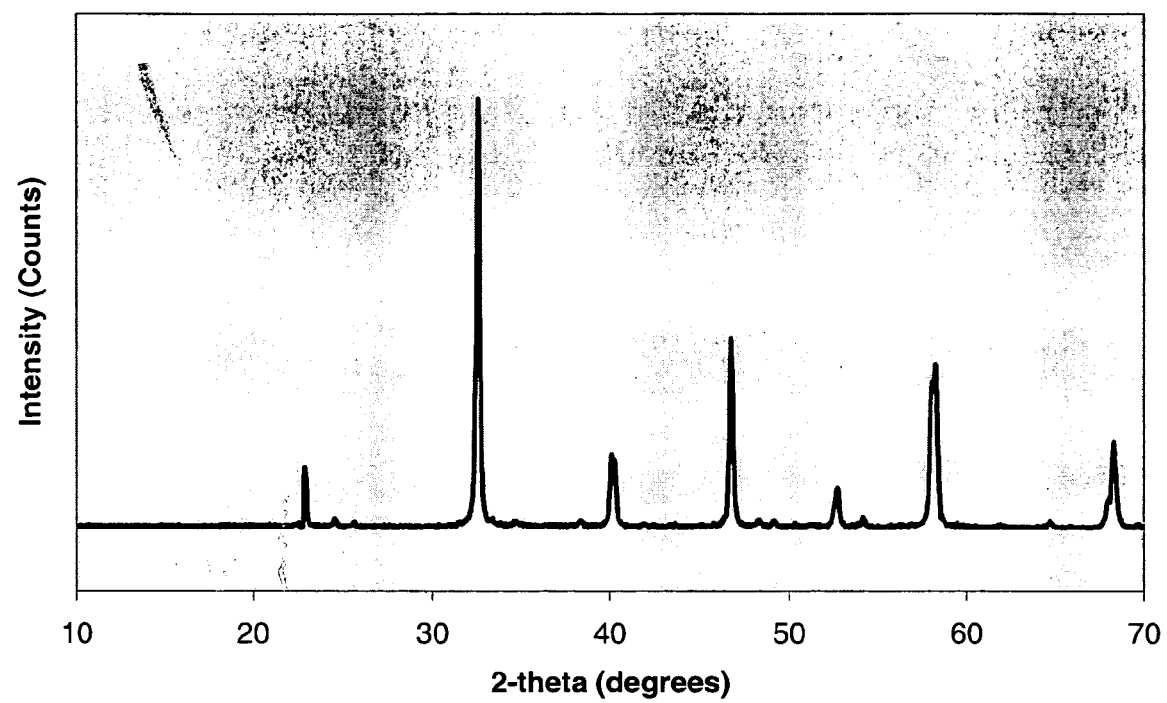
FIG. 1 shows the X-ray diffractogram of the hydrogen membrane material of Example 1, $La_{0.9}Ca_{0.1}CrO_{3-d}$.
Figure 2:
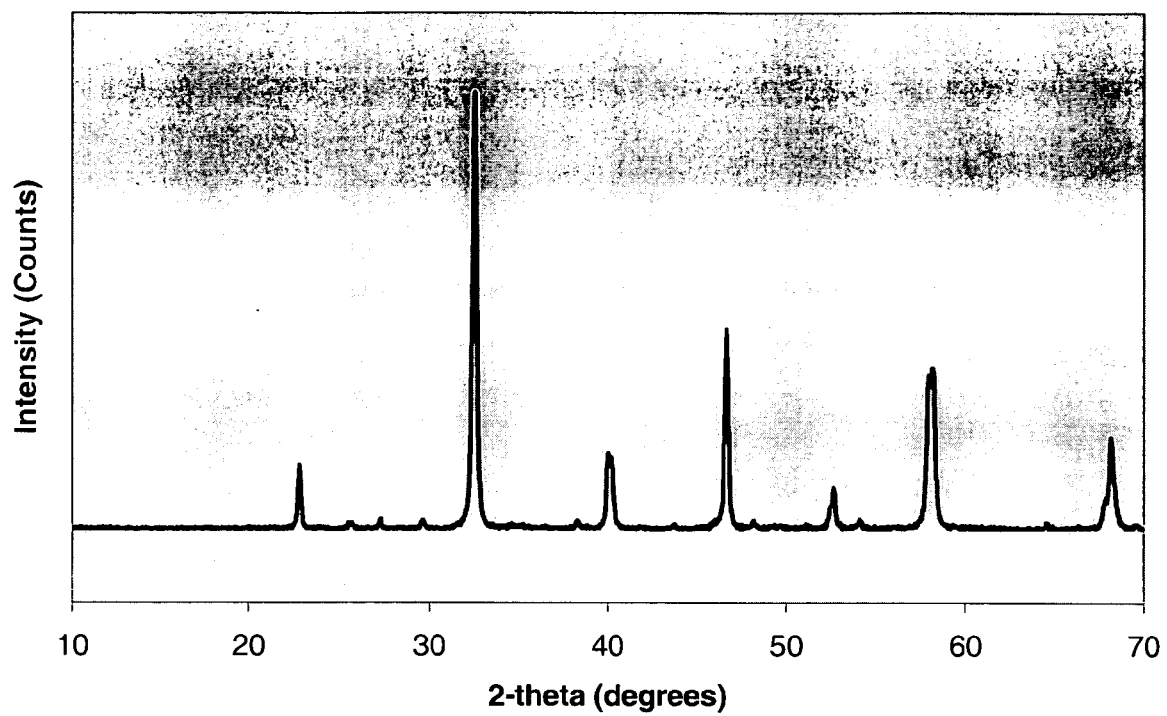
FIG. 2 shows the X-ray diffractogram of the hydrogen membrane material of Example 2, $La_{0.9}Sr_{0.1}CrO_{3-d}$.

XRD diffractograms of the hydrogen membrane materials of Examples 1 and 2 are shown in FIGS. 1 and 2. Both materials are single phase and possess the perovskite structure.

EXAMPLE 9

Hydrogen Permeation Test of a Dense $La_{0.9}Sr_{0.1}CrO_{3-d}$ Membrane

The mixed proton and electron conducting membrane disk of Example 2 was attached to an alumina tube by placing one gold ring between the membrane and the alumina tube and one gold ring between the membrane and a quartz support structure. The membrane assembly was heated to 1050° C. where the gold softened and a seal formed between the membrane and the alumina tube.

Initially, 200 ml/min (STP) of nitrogen was flushed across the outside (high $p_{H2}$ or primary) surface of the membrane, and 100 ml/min (STP) of helium across the inside (low $p_{H2}$ or secondary) surface. Analysis of the oxygen and nitrogen content of the exiting helium stream by means of gas chromatography showed the absence of internal or external gas leakages.

After the initial leak test, 200 ml/min (STP) of a mixture of nitrogen, hydrogen (0-60%) and water (2-40%) was flushed across the high $p_{H2}$ surface of the membrane, and 100 ml/min (STP) of helium across the low $p_{H2}$ surface. The concentrations of hydrogen and water in the exiting helium stream were measured by the gas chromatograph, as well as nitrogen and oxygen. The flux of hydrogen and oxygen through the membrane may be calculated from these measured contents. In the absence of leakages, the following formulas may be used:

$$J_{H_2} = (X_{H_2} + X_{H_2O}) \cdot \frac{F_{tot}}{A_{mem}}$$

$$J_{O_2} = \frac{1}{2} \cdot X_{H_2O} \cdot \frac{F_{tot}}{A_{mem}}$$

where $J_{H2}$ is the hydrogen flux per membrane area, $J_{O2}$ is the oxygen flux per membrane area, $X_{H2}$ is the mole fraction of $H_2$ in the exiting He sweep stream, $X_{H2O}$ is the mole fraction of $H_2O$ in the exiting He sweep stream, $F_{tot}$ is the total flow rate of gas exiting the low $P_{H2}$ compartment of the hydrogen permeation cell, and $A_{mem}$ is the active area of the membrane. The hydrogen and oxygen flux was determined at several temperatures between 400° C. and 1060° C.

Figure 3:
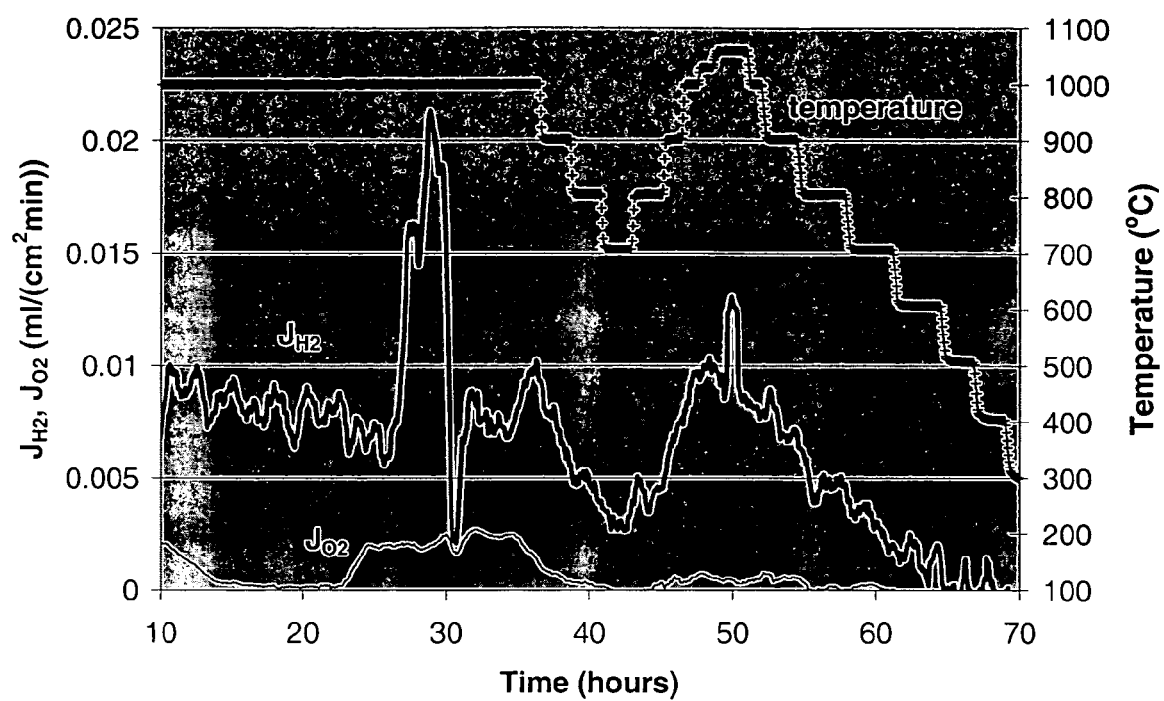
FIG. 3 shows the hydrogen permeation characteristics of the membrane material of Example 2. The hydrogen and water partial pressures in the gas at the high $P_{H2}$ side of the membrane were as follows.

FIG. 3 shows the hydrogen and oxygen flux (left abscissa, fully drawn lines) and the temperature (right abscissa, crosses) as functions of time during the hydrogen permeation test. The hydrogen flux at 1000° C. and 1.0 mm membrane thickness, with $P_{H2}$=0.6 bar and $P_{H2O}$=0.4 bar in the primary gas, was 0.02 ml/(cm²min).

EXAMPLE 10

Hydrogen Permeation Test of a Dense $La_{0.7}Sr_{0.25}CrO_{3-d}$ Membrane

The mixed proton and electron conducting membrane disk of Example 3 was mounted in the permeation test equipment according to Example 9. A permeation test was conducted according to the procedure described in Example 9.

FIG. 4 shows the hydrogen and oxygen flux (left abscissa, fully drawn lines) and the temperature (right abscissa, crosses) as functions of time during the hydrogen permeation test. The hydrogen flux at 1030° C. and 1.0 mm membrane thickness, with $P_{H2}$=0.3 bar and $P_{H2O}$=0.4 bar in the primary gas, was 0.01 ml/(cm²min).

EXAMPLE 11

High Temperature Creep Test of a Dense $Ca(Fe_{0.1}Ti_{0.9})_{0.97}O_{3-d}$ Membrane and a Dense $Ca(Fe_{0.1}Ti_{0.9})_{1.03}O_{3-d}$ Membrane The mixed proton and electron conducting membrane disks of Examples 6 and 7 were cut into rectangular bars. These bars were mounted in a high temperature 3-pt bend jig and held at the test temperature for an extended period of time whilst a small load was applied. After cooling, the permanent deformation of the bar was determined by measuring the mid-point deflection, and this was related to the loading conditions and the temperature and duration of the test.

FIG. 5 shows the normalised strain rate versus temperature of the membrane disks of Examples 6 and 7. The $Ca(Fe_{0.1}Ti_{0.9})_{0.97}O_{3-d}$ membrane disk has a considerably higher resistance against creep than the $Ca(Fe_{0.1}Ti_{0.9})_{1.03}O_{3-d}$ membrane disk. This illustrates the importance of the A/B ratio, or the value of w of the formula $A_{1-x}A'_x(B_{1-y}B'_y)_wO_{3-d}$.

The invention claimed is:

1. A solid multicomponent mixed proton and electron conducting membrane for use in a reactor, wherein the membrane comprises a mixed metal oxide having a structure represented by the formula:

$$A_{1-x}A'_x(B_{1-y}B'_y)_wO_{3-d}$$

wherein A is a lanthanide element or mixtures thereof, A' is an alkaline earth element or mixtures thereof, B is chromium, manganese or iron, B' is titanium, aluminium, zirconium, or hafnium, and x, y, w, and d each represent a number such that $0<x<1, 0<y<1, 0.9<w<1.1$, and d equals a number that renders the compound charge neutral and is not less than zero and not greater than about 0.6.

2. A membrane according to claim 1, wherein A' is strontium or calcium.

3. A membrane according to claim 1, wherein A is lanthanum.

4. A membrane according to claim 1, wherein B is chromium and y=0.

5. A membrane according to claim 1, wherein A' is strontium or calcium, A is lanthanum, B is chromium and y=0.

6. A method for the production of hydrogen or hydrogen mixtures, which comprises transporting hydrogen in a hydrogen containing gaseous mixture through the membrane of claim 1.

* * * * *